United States Patent Office 3,147,545
Patented Sept. 8, 1964

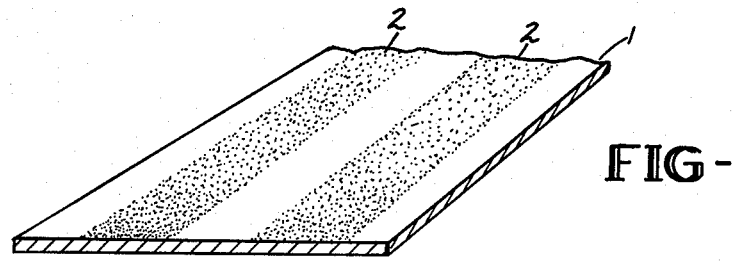

3,147,545
METAL FABRICATION
Emery I. Valyi, Riverdale, N.Y., assignor to Olin Mathieson Chemical Corporation, a corporation of Virginia
Filed Aug. 24, 1962, Ser. No. 219,338
5 Claims. (Cl. 29—421)

This invention relates to composites formed by integrating a layer of porous permeable material to a base of solid material and more particularly of a porous metal element to a base of solid sheet metal.

In co-pending applications, Serial No. 732,663 filed May 2, 1958, now U.S. Patent 3,049,195, issued August 21, 1962, and U.S. Serial No. 202,612, filed June 14, 1962, various methods of fabricating the aforesaid metallic elements are disclosed. In the first said application the process therein comprises applying a pattern of stop-weld material to a surface of a metal sheet followed by superimposing on this surface a sinterable porous body, such as compacted metal aggregate, which is metallurgically bonded to the metal sheet in the adjacent areas therebetween not separated by the stop-weld material. This unification is then followed by distention of the metal sheet in the areas thereof not joined to the porous body. Such distention results in a system of fluid channels in communicating relationship with the porous body. However, as can be appreciated, the volumetric capacity of these fluid channels is necessarily limited by the elongation characteristics of the metal sheet.

In the foregoing last said application, the disclosure thereof describes a process in which the desired fluid channels are preliminarily formed in the metal sheet by suitable embossment thereof to form groove-like indentations corresponding to the desired system of fluid channels followed by superimposing on the metal sheet a sheet-like porous body of metal aggregate which is metallurgically bonded to this sheet. Although this process has particular advantages for some applications, however, in the use of loose or lightly compacted metal aggregate in this alternate process, such aggregate body must usually be supported by filling in the indentations with an evanescent material which is eliminated following the step of metallurgical bonding of the metal aggregate to the metal sheet.

Accordingly, it is an object of this invention to provide an improved process for making composites having a porous body metallurgically integrated to a solid sheet metal backing member.

It is a further object of this invention to provide a novel process for making a composite having a porous body metallurgically integrated to a solid sheet metal member.

Other objects and advantages of this invention will become more apparent from the following description and drawings in which:

FIGURE 1 is a perspective view partly in section of a treated solid sheet metal backing member utilized in one embodiment of this invention;

FIGURES 2 and 3 are perspective views partly in section illustrating subsequent processing in accordance with this invention of the sheet metal member shown in FIGURE 1;

FIGURES 4 and 5 are elevational views in section illustrating a still further processing of the preceding figures;

Figure 6:
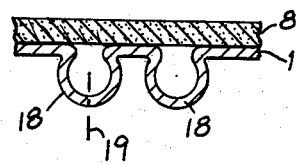
FIGURE 6 is a cross-sectional view in elevation illustrating a still further embodiment of this invention.

Briefly speaking this invention encompasses the embossment of a metal sheet similar to that disclosed in the aforesaid co-pending application, Serial No. 202,612, with the included novel feature of bringing the edges of the indentation common with the edge of the remaining planar portions of the sheet together into abutment so as to provide a continual support for the porous, permeable bodies superimposed on the sheet thereby obviating the need to supply alternate means of supporting such porous bodies, as for instance by means of an evanescent spacer material contained in the said embossments.

More specifically, by reference to the drawings, FIGURE 1 shows a metal sheet 1 having one surface thereof coated with a plurality of bands of stop-weld material 2. The sheet may be comprised of any suitable metal, such as aluminum, copper and the like. For example, the sheet may be a 0.020 inch thick sheet of low carbon steel, 24 inches in width and several feet in length. The bands of stop-weld material may be of any suitable weld inhibiting material, such as suspension titanium oxide and the like, and applied in bands of 2 inches in width. Thereafter, the metal sheet 1 is then suitably bent, as by pressing, stamping and the like to form in one surface of the sheet troughs 3 which protrude out of the opposite surface of the sheet as elongated bulges. As shown in the drawings the metal sheet is bent in a specific section of the areas thereof covered by the stop-weld material and disposed to coextend with and in spaced relationship with the sides 4 and 5 of the sheet so as to retain lateral marginal portions 6 of said band within the original plane of the sheet.

Thereafter, the troughs 3 are then closed by squeezing their side walls together sufficiently to bring the inner surfaces of the trough into abutting relationship with each other. As can be seen in FIGURE 3 the troughs are converted into folds 7 while forming the upper surface of sheet 1 into a substantially uninterrupted area for supporting a mass or sheet-like body of sinterable metal aggregate 8. After superimposition of the body of metal aggregate 8 on sheet 1, the two elements are then metallurgically bonded together by any suitable method such as sintering, brazing, and the like.

A porous body in the ultimate structure may be made of metal aggregate or of several other types of porous metal structures such as woven wire mesh, expanded strip stock and others known in the art of producing permeable metal structures; and it may be of any conventional material as for example aluminum, copper, nickel and alloys thereof, stainless steels, various ferrous alloys, fluorocarbon resins, ceramics and other like materials. For purposes of the present description the porous body is illustrated as consisting of metal aggregate which may comprise a mass of metal particles suitably sintered into the desired form, or the porous body may comprise a metal aggregate compressed into sufficient rigidity for subsequent manipulation in the processing required therefor.

Specifically, in reference to the foregoing, the metal aggregate may be comprised, for example, of low carbon steel aggregate of 0.1 diameter spheres suitably superimposed on the sheet into a 0.250 inch thick layer, to be bonded in the course of subsequent furnace treatment into a unified structure having a porous and a solid layer as above described.

Following the unification of the metal aggregate to the sheet metal unit, the resultant composite structure may be suitably expanded in any suitable manner either freely or in apparatus such as disclosed in FIGURE 4. As shown in this figure, this structure comprises a forming die 9 having a plurality of forming cavities 10 defined by side walls 11 which function to confine the distention of the unwelded portions of the composite structure upon expansion. After placing of the composite structure on forming die 9, a co-acting head 12, which is suitably mounted to a conventional reciprocating means, not shown, for raising and lowering the head 12 to and away from mating or cooperating relationship with forming die 9, is disposed in sealing relationship with the forming die for expansion of the composite structure. The co-acting head 9 is maintained in sealing relationship with forming die 9 by means of an O-ring 13 mounted in an annular groove 14. Co-acting head 12 is further provided with a compartment 15 for receiving and containing a suitable hydraulic fluid, such as water, air, and the like, from a conduit 16 in communicating relationship with compartment 15 and with a source of fluid pressure controlled by any suitable valving, such as 17. The composite structure is expanded by injecting into compartment 15 a fluid under suitable pressure required to distend the unwelded portions extending within the composite structure. This fluid, under pressure, flows through the interstices of the porous body 8 to force the unjoined portions, within the composite structure, to distend into a configuration substantially similar to that shown in FIGURE 5. The distended unjoined areas form fluid channels 18 which may be used for conducting a fluid for distribution to the exterior of the composite structure by flow or distribution through the interstices of the porous body 8.

FIGURE 6 illustrates an embodiment of this invention in which the unjoined areas extending within the composite structure are distended freely without any external restraint by injecting against the unjoined portions a fluid pressure through the interstices of the porous body 8.

As will be appreciated, the present invention provides an improvement enabling the formation of channels having a greater depth in relation to their width. Such an improvement may be utilized with greater advantage in various applications, for example in the construction of atmospheric gas burners. In the use of such composite structure for burner bodies, narrower channel widths are feasible to enable the attainment of a uniform and almost completely uninterrupted flame pattern on the external surface of the porous component. In addition, such a configuration enables the conduction of a substantial volume of combustible gas through the narrow channels with a minimum of pressure drop, thus decreasing dependence on mechanically generated pressures, as in a pressure burner.

Figure 7:
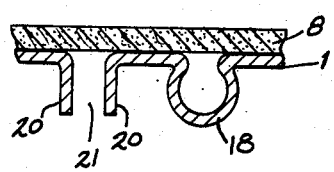
FIGURES 7 to 10 are cross-sectional views in elevation illustrating various processing steps of still another embodiment of this invention.
Figure 8:
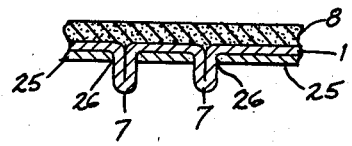
Figure 9:
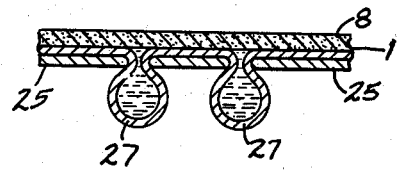

FIGURE 7 shows a modification of this invention in which one of the channels 18 is severed along a line of severance 19 extending along the crest of the channel to provide a pair of reinforcing ribs 20 with an open gap 21 between them. In the use of such a modification, during the course of burning, secondary air for combustion is furnished through the porous layer at the location of the opened channel 18 which is open to the atmosphere with the structure of the burner reinforced by the ribs 20 which are shown in FIGURE 7.

Figure 10:
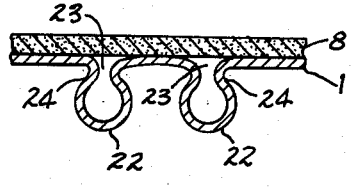

FIGURE 10 illustrates a modification having fluid channels 22 of oval cross-section such as those obtained by distention above, which, however, is joined to a smaller chamber portion 23 by means of a neck or restriction 24. This modification is obtained by inflating the solid sheet metal member 1 in the absence of any restraint other than for a constraining pad 25 provided with openings or apertures 26 for receiving only the folds 7 of the unified composite structure. The inflation is continued until a preliminary fluid channel 27 is obtained after which the constraining pad 25 is removed, followed by continuing the inflation until the fluid channels 22 are formed. The use of such a constraining pad 25 restricts the expansion solely to the unjoined portions of folds 7 while constraining the unjoined portions of the composite structure defined by the marginal portion 6 of the stop-weld material remaining in the original plane of sheet metal member 4, against separation or displacement from abutment with the porous component 8. However, when the constraining pad 25 is removed after the preliminary expansion, the continued inflation causes the sections of sheet metal member 1 defined by the marginal portions of the stop-weld material to be forced to separate from the porous component 8 into spaced relationship therewith.

Although the invention has been described with reference to specific embodiments, materials and details, various modifications and changes, within the scope of this invention, will be apparent to one skilled in the art and are contemplated to be embraced within the invention.

What is claimed is:

1. A method of making a hollow structure comprising applying an elongated band of stop-weld material to a surface of a metal sheet with the lateral sides of said band being spaced from a corresponding pair of lateral edges of said sheet, bending said surface in the area thereof covered by said band to form a trough defined by an elongated bulge protruding out of the opposite surface of said sheet with said trough being disposed in said area to coextend with and in spaced relationship with said sides whereby lateral marginal portions of said band remain in the original plane of said sheet, bringing adjacent lateral surfaces of said trough together into substantially abutting relationship to convert said bulge into a fold, superimposing a flat sheet-like body on the first said surface to sandwich therebetween the said marginal portions of said band, forming a unitary structure by bonding said body to said sheet in the adjacent areas therebetween not separated by said material, and distending the unwelded portions of said sheet defined by said material by separation of the unjoined adjacent surfaces to form fluid channels extending within said unitary structure adjacent said body.

2. The method of claim 1 wherein said distention includes the step of forming said channels by distending the stop-weld coated portion of said fold by separation of the adjacent surfaces thereof to form said channels.

3. The method of claim 2 wherein the unwelded portions of said sheet adjacent said body and defined by the said marginal portions of said band are spaced from said body by separation therefrom.

4. A method of making a hollow structure comprising applying at least two elongated bands of stop-weld material to a surface of a metal sheet with the lateral sides of each of said bands being spaced from a corresponding pair of lateral edges of said sheet, bending said surface in each of the areas thereof covered by said bands to form corresponding troughs each defined by an elongated bulge protruding out of the opposite surface of said sheet with each of said troughs being disposed in their respective areas to coextend with and in spaced relationship with said sides wherein lateral marginal portions of each of said bands remain in the original plane of said sheet, bringing adjacent lateral surfaces of each of said troughs together into substantially abutting relationship to convert each of said bulges into corresponding folds, superimposing a flat sheet-like body on the first said surface to sandwich therebetween the said marginal portions of said bands, forming a unitary structure by bonding said body to said sheet in the adjacent areas therebetween not separated by said material, and distending the unwelded portion of said sheet defined by said material by separation of the unjoined adjacent surfaces to form fluid channels extending within said unit adjacent said body.

5. The method of claim 4 including the step of severing one of said channels along the crest thereof, and erecting each of the severed portions of said one channel adjacent the line of severance into ribs extending out of said other surface.

References Cited in the file of this patent

UNITED STATES PATENTS

| | | |
|---|---|---|
| 2,690,002 | Grenell | Sept. 18, 1954 |
| 2,887,146 | Hesterman | May 19, 1959 |

FOREIGN PATENTS

| | | |
|---|---|---|
| 212,814 | Australia | Feb. 7, 1958 |